Feb. 20, 1962  J. M. GRUBER  3,022,123
TILTING PAD JOURNAL BEARINGS
Filed Sept. 21, 1959  2 Sheets-Sheet 1

INVENTOR.
Jerome M. Gruber
BY
Morsell & Morsell.
ATTORNEYS.

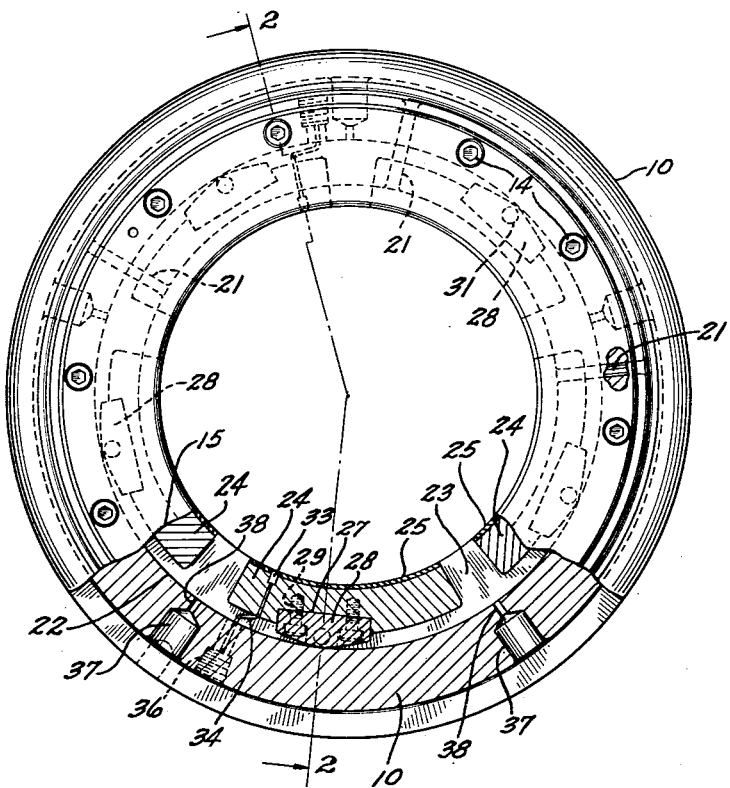
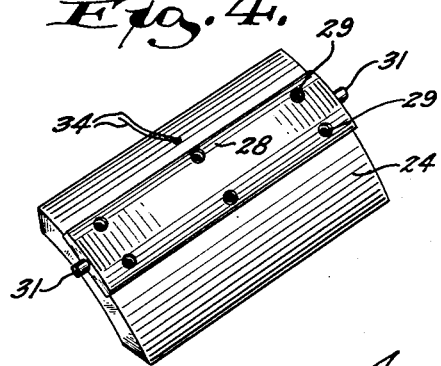

United States Patent Office 3,022,123
Patented Feb. 20, 1962

3,022,123
TILTING PAD JOURNAL BEARINGS
Jerome M. Gruber, Waukesha, Wis., assignor to Waukesha Bearings Corporation, Waukesha, Wis., a corporation of Wisconsin
Filed Sept. 21, 1959, Ser. No. 841,121
7 Claims. (Cl. 308—73)

This invention relates to improvements in tilting pad journal bearings.

Tilting pad journal bearings are in common use for a number of purposes. In certain applications, however, where there are strains on the shaft producing a certain amount of deflection, the pads of the conventional tilting pad journal bearing are not capable of maintaining a desired alignment. This is particularly true of bearings for use in gyroscope applications on board a submarine where the shaft is generally vertical but is adapted to tilt back and forth.

It is a general object of the present invention to provide an improved tilting pad journal bearing, wherein the pads are so supported that they are capable of automatically aligning themselves axially as well as circumferentially.

A more specific object of the invention is to provide a tilting pad journal bearing wherein each pad is supported on a rocker plate, each rocker plate being transversely convex for conventional rocking movement of the pad and also longitudinally convex to provide for rocking of the pad in a direction at right angles to the first direction.

A further object of the invention is to provide a tilting pad journal bearing having improved means for supplying oil to each pad directly and having improved means for the discharge of said oil whereby the pads operate submerged to increase damping.

A further object of the invention is to provide a tilting pad journal bearing wherein there are readily detachable end covers having trunnion holes for cooperation with trunnions on the pad rocker plates, said trunnion holes serving to support the plates and pads and to accurately locate the pads in axial alignment with the shaft, the fit of the trunnions in said holes being loose to permit limited rocking of the pads on the longitudinal convexities of the outer faces of the rocker plates.

A still further object of the invention is to provide an improved tilting pad journal bearing as above described wherein the rocker plates are detachably connected to the pads in a way to permit shimming between the plates and pads whereby the clearance at the bore may be varied.

A further object of the invention is to provide an improved tilting pad journal bearing which is relatively simple in construction, which can be quickly disassembled for repair, which is strong and durable, and which is otherwise well adapted for the purposes described.

With the above and other objects in view, the invention consists of the improved tilting pad journal bearing, and all of its parts and combinations, as set forth in the claims, and all equivalents thereof.

In the accompanying drawings, in which the same reference numerals designate the same parts in all of the views:

FIG. 3 is a top view of the bearing, parts being broken away and shown in section; and FIG. 4 is a perspective view of one of the tilting pads with its attached rocker plate, looking at the outer convex faces.

Figure 2:
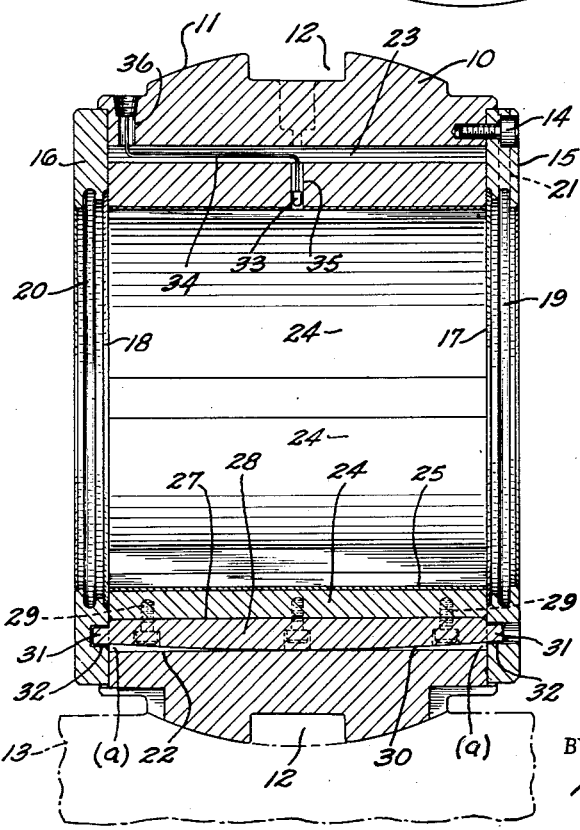
FIG. 2 is a cross-sectional view taken on the line 2—2 of FIG. 3, the dot and dash lines indicating how it is adapted to fit in a machine frame.

Referring more particularly to the drawing, numeral 10 designates a housing which, in the embodiment shown, has a spherical outer periphery 11 provided with a peripheral oil groove 12. The housing illustrated is adapted to coact with a suitably shaped frame part, the shape of which is shown diagrammatically by dot and dash lines at 13 in FIG. 2. This provides a self aligning spherical seat for the housing, and there is, of course, suitable means for supplying oil under pressure to the groove 12.

Figure 1:
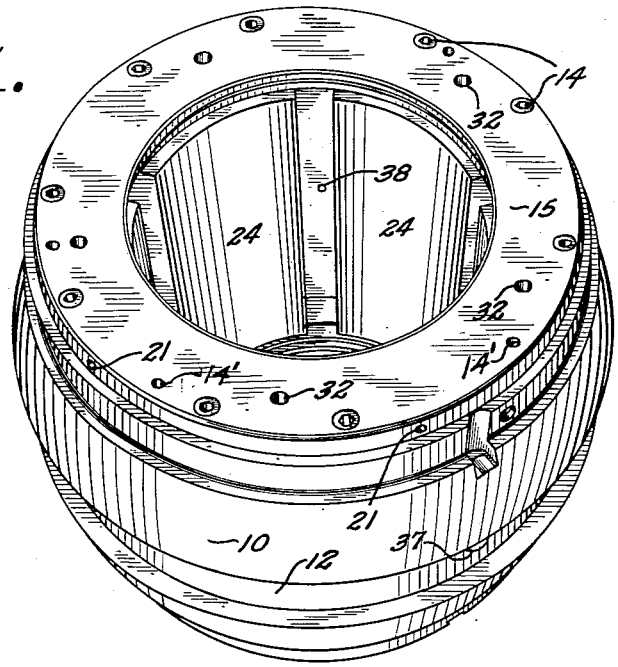
FIG. 1 is a perspective view of the bearing showing it in generally upright position.

Detachably secured by bolts 14 to the ends of the housing 10 are ring-shaped covers or end plates 15 and 16. On the inner faces of the covers surrounding the central opening are annular recesses 17 and 18 respectively. In addition, there are oil collecting grooves 19 and 20 respectively. The cover member 15, which is adapted to be the top cover when the bearing is disposed in the upright position of FIG. 1, is formed with radially extending oil holes 21, the inner ends of which connect with the oil collecting groove 19 and the outer ends of which extend through the outer periphery of the end cover to the exterior. On a five-pad bearing there are preferably five oil holes but this exact number may be varied. These oil holes 21 in the top cover allow oil to flow out from the top of the bearing when the bearing is in the upright position of FIG. 1, as will be hereinafter explained. If desired for other applications, the oil holes may be used in both covers but in the illustrated embodiment of the invention they are shown only in the top cover to obtain submerged operation.

The cover plates 15 and 16 project inwardly a substantial distance beyond the bore 22 of the housing 10 to form therewith an annular pad-accommodating groove 23 for receiving tilting pads 24. Each pad has a concave inner face to fit the shaft which is to be journalled in the bearing, and said faces are preferably lined with babbitt, as at 25. In the embodiment of the invention shown there are five pads which are adapted to embrace the shaft which is to be journalled in the bearing. The number of pads, however, may be varied as required.

The outer face of each pad is convex to substantially match the bore 22 of the housing and each outer face is provided with an axially extending groove 27 for detachably receiving an axially extending rocker plate 28. The rocker plates are adapted to be held in position by screws 29 and there may be shims in the joint between the inner face of each rocker plate and the bottom of the groove 27. These shims may be .001" and .0015", and by varying the number of shims the clearance may be varied as desired. With the detachable rocker plate construction this change of shims may be easily accomplished. The outer face of each rocker plate 28 is transversely convex or crowned as shown in FIG. 3, so that the connected pad can adjust circumferentially around the shaft. In addition, however, it is a novel feature of the present invention that each rocker plate is convex or crowned in a longitudinal or axial direction to a much lesser degree than the transverse crowning, as indicated at 30 in FIG. 2 in an exaggerated manner for purposes of clarity. This allows the rocker plate and its connected pad to axially align itself with the shaft to adapt itself to conditions encountered in use.

In order to permit this rocking of the plates on the longitudinal convexities 30, end trunnions 31 of the plates fit loosely in holes 32 in the end covers 15 and 16. These holes in one of the covers such as the top cover 15 preferably extend through as illustrated in FIG. 1. It is to be noted that each rocker plate 28 is preferably connected to its pad so as to be offset somewhat toward one side of the pad, as is clear from FIG. 3. The actual clearance at $a$ is only .005" in the illustrated embodiment, but this may vary to meet requirements. In any event the crowning at 30 is very small so that the rocker plate has a relatively long contact area so as to maintain a high load carrying capacity.

The use of the solid housing arrangement with readily separable end covers having accurately positioned holes 32 for receiving the trunnions 31 of the rocker plates provides for accurate location of the pads in axial alinement with the shaft whenever the end cover plates are connected by their bolts 14 and dowels 14′.

In order to provide a measure of the temperature of the babbitt 25 on the pads it is preferred to have temperature responsive devices 33 inserted in each pad in contact with the babbitt, there being flexible electric leads 34 extending through holes 35 in the pads and leading out through openings 36 in the housing to a suitable instrument.

In use of the journal bearing, with a shaft embraced by the pads 28, it is apparent that due to the novel contour on the outer faces of the rocker plates 28 that the pads are capable of axial as well as circumferential alinement with the shaft. Limited rocking of the rocker plates on the longitudinal convexities 30 is permitted by the loose fit of the trunnions 31 in the cover plate holes 32. During use, the housing groove 12 is kept filled with oil under pressure and this oil flows into the oil cups 37 in the housing 10 and out of the oil inlet holes 38 which lead from the cups to the pad accommodating groove 23. There is preferably one oil inlet hole 38 for each pad. With this arrangement the bearing is kept constantly filled with oil, which oil continuously flows out of the outlet holes 21 in the cover 15. In this way the pads operate in a submerged condition, increasing the damping action. Due to the fact that the pads can rock in two directions at right angles to one another, the pads are capable of adapting themselves to deflected conditions of a shaft which is journalled in the bearing when the shaft is under a stress which produces such deflection.

It is to be understood that the present invention is not to be limited to the exact details of construction shown and described for obvious modifications will occur to persons skilled in the art.

What I claim is:

1. In a tilting pad journal bearing having an annular housing with a peripheral wall and with a bore and having an annular series of arcuate tilting pads within said housing positioned to embrace a shaft therebetween, readily detachable ring-shaped covers on the ends of said housing forming with the housing an annular pad-accommodating groove, the peripheral wall of said housing having oil holes at circumferentially spaced points adapted to conduct oil from an outside source to said pad-accommodating groove, one of said ring-shaped covers having a grooved inner periphery and having radially extending oil holes extending outwardly from said grooved inner periphery and providing for the discharge of oil in a radially outward direction from the shaft.

2. In a tilting pad journal bearing having an annular housing with a bore and having an annular series of arcuate pads within said housing positioned to embrace a shaft therebetween, an axially extending rocker plate detachably bolted to and projecting from the outer side of each pad, there being a shim accommodating joint between said plate and pad, each rocker plate having a transversely convex outer face for rocking engagement with the bore of the housing, and end retaining means on said housing positioned to support said plates and pads.

3. In a tilting pad journal bearing having an annular housing with a bore and having an annular series of arcuate pads within said housing positioned to embrace a shaft therebetween, an axially extending rocker plate detachably connected to and projecting from the outer side of each pad, each rocker plate having a transversely convex outer face for rocking engagement with the bore of the housing and having end trunnions, a pair of ringshaped end covers for said housing and pads, said end covers having trunnion holes positioned to rockably receive said plate trunnions to support said plates and pads and to accurately locate the pads in axial alignment with the shaft.

4. In a tilting pad journal bearing having an annular housing with a bore and having an annular series of arcuate pads within said housing positioned to embrace a shaft therebetween, an axially extending rocker plate detachably connected to and projecting from the outer side of each pad, each rocker plate having a transversely convex outer face free of connection with said bore for rocking movement in the bore of the housing and having end trunnions, a pair of ring-shaped end retaining members for said housing and pads, at least one of which is removable, said end members having trunnion holes positioned to rockably receive said plate trunnions to support said plates and pads and to accurately locate the pads in axial alignment with the shaft, said transversely convex outer face normally having only central contact with said housing bore so that there may be rocking on the trunnions without necessity of sliding movement whereby said rocking may take place under high loads without freezing.

5. In a tilting pad journal bearing having an annular housing with a bore and having an annular series of arcuate pads within said housing positioned to embrace a shaft therebetween, an axially extending rocker plate detachably connected to and projecting from the outer side of each pad, each rocker plate having a transversely and longitudinally convex outer face free of connection with said bore for rocking movement in two directions at right angles to one another in the bore of the housing and having end trunnions, a pair of ring shaped end retaining members for said housing and pads, said end members having trunnion holes positioned to rockably receive said plate trunnions to support said plates and pads and to accurately locate the pads in axial alignment with the shaft, the fit of the trunnions in the holes being loose to permit only limited rocking of the pads on the longitudinal convexities of the outer faces of the rocker plates, said transverse and longitudinally convex outer face portions normally having only central contact with said housing bore so that there may be rocking in either direction without necessity of sliding movement whereby said rocking may take place under high loads without freezing.

6. In a tilting pad journal bearing having an annular housing with a bore and having an annular series of arcuate pads within said housing positioned to embrace a shaft therebetween, an anxially extending rocker plate projecting from the outer side of each pad, each rocker plate having a transversely and longitudinally convex outer face free of connection with said bore for rocking movement in two directions at right angles to one another in the bore of the housing and having end trunnions, a pair of ring shaped end retaining members for said housing and pads, said end members having trunnion holes positioned to rockably receive said plate trunnions to support said plates and pads and to accurately locate the pads in axial alignment with the shaft, the fit of the trunnions in the holes being loose to permit only limited rocking of the pads on the longitudinal convexities of the outer faces of the rocker plates, said transverse and longitudinally convex outer face portions normally having only central contact with said housing bore so that there may be rocking in either direction without necessity of sliding movement whereby said rocking may take place under high loads without freezing.

7. In a tilting pad journal bearing having an annular housing with a bore and having an annular series of arcuate pads within said housing positioned to embrace a shaft therebetween, an axially exending elongated rocker plate connected to and projecting from the outer side of each pad, each rocker pltae having a transverse convexity on its outer face and having a substantially lesser longitudinal convexity on its outer face free of connection wtih said bore for rocking engagement in two directions at right angles to one another in the bore of the housing and having end trunnions, a pair of ring shaped end members for said housing and pads, said end members having trunnion holes positioned to rockably receive said plate trunnions to support said plates and pads and to acurately locate the pads in axial alignment with the shaft, the fit of the trunnions in the holes being loose to permit limited rocking of the pads on the longitudinal convexities of the outer faces of the rocker plates, said transverse and longitudinally convex outer face portions normally having only central contact with said housing bore so that there may be rocking in either direction toward one of the trunnions as permitted by the loose fit of the trunnions in their holes whereby said rocking may taken place under high loads without freezing.

References Cited in the file of this patent

UNITED STATES PATENTS

| | | |
|---|---|---|
| 1,161,721 | Parsons | Nov. 23, 1915 |
| 2,067,191 | Hudson | Jan. 12, 1937 |
| 2,072,814 | Haas | Mar. 2, 1937 |
| 2,498,011 | Sherbondy | Feb. 21, 1950 |
| 2,743,142 | Balsiger | Apr. 24, 1956 |

FOREIGN PATENTS

| | | |
|---|---|---|
| 197,179 | Great Britain | May 10, 1923 |
| 547,306 | Great Britain | Aug. 21, 1942 |
| 1,016,983 | Germany | Oct. 3, 1957 |